United States Patent

[11] 3,588,419

| [72] | Inventor | Pierre Rongier<br>Bretigny, France |
|---|---|---|
| [21] | Appl. No. | 853,151 |
| [22] | Filed | Aug. 26, 1969 |
| [45] | Patented | June 28, 1971 |
| [73] | Assignee | Commissariat A L'Energie Atomique<br>Paris, France |
| [32] | Priority | Sept. 10, 1968 |
| [33] | | France |
| [31] | | 165,694 |

[54] REFERENCE VOLTAGE GENERATOR FOR A TEMPERATURE CONTROL PROGRAMMER
4 Claims, 3 Drawing Figs.

[52] U.S. Cl. .................................................. 318/163,
318/305, 219/493, 236/46
[51] Int. Cl. ..................................................... G05b 19/02,
G05d 23/00
[50] Field of Search ........................................ 318/443,
444, 305, 163, 164, 332, 31, 20.427, 20.620;
236/91, 46; 13/12, 24; 219/494, 492, 493

[56] References Cited
UNITED STATES PATENTS

| 2,958,027 | 10/1960 | Moseley et al. ............... | 318/305 |
| 3,301,481 | 1/1967 | Amy et al. .................... | 219/492X |
| 3,479,487 | 11/1969 | Stoll ............................ | 219/494 |

*Primary Examiner*—Oris L. Rader
*Assistant Examiner*—Robert J. Hickey
*Attorney*—Cameron, Kerkam and Sutton

ABSTRACT: The generator is designed to produce a reference voltage in compliance with a predetermined program and is particularly applicable to a programmer for a temperature controller. The generator comprises a reference potentiometer, a motor which actuates said potentiometer, a device which controls the speed of the motor and provides $n$ selectable speeds, a voltage-generating device which is capable of producing $n$ selectable reference voltages, a comparator having two inputs in which the first input receives the voltage delivered by the potentiometer and the second input receives in succession one of the $n$ reference voltages supplied by the voltage-generating device, a timing device which is controlled by the comparator and capable of producing $n$ selectable time intervals, and a selector-switch device.

PATENTED JUN28 1971  3,588,419
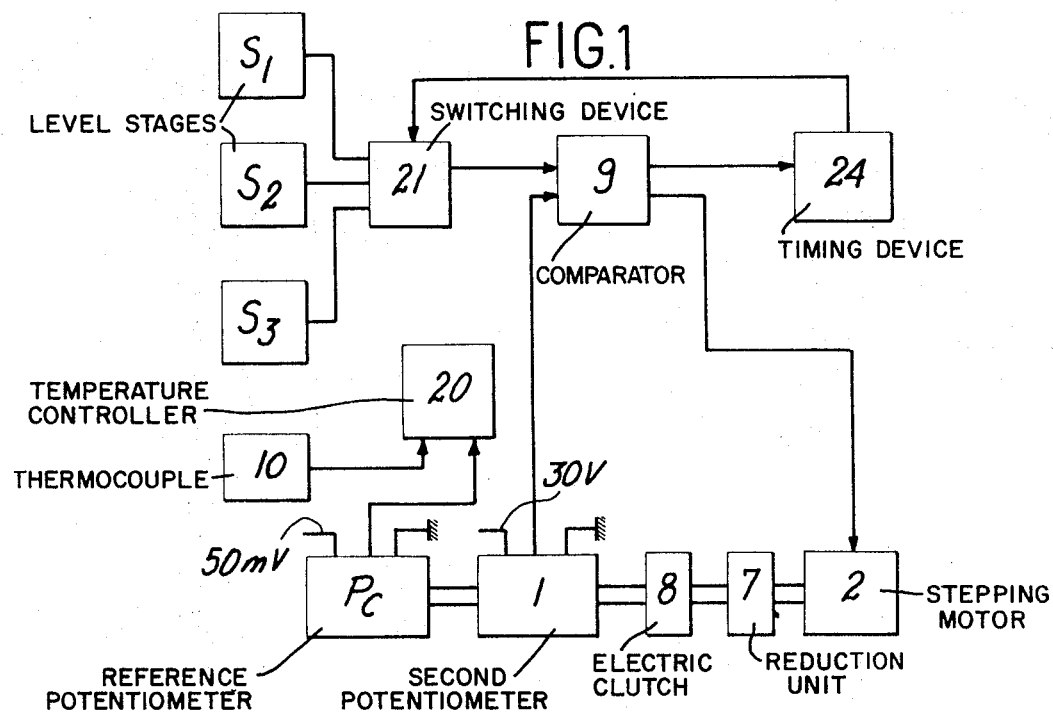
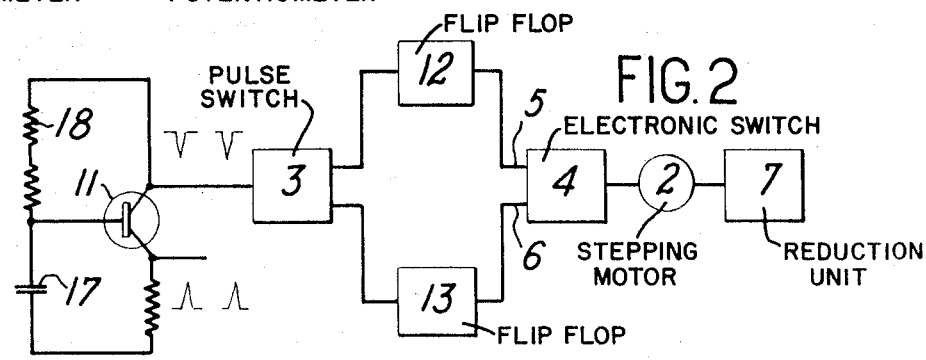
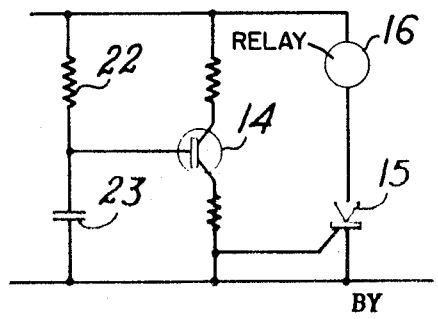

REFERENCE VOLTAGE GENERATOR FOR A TEMPERATURE CONTROL PROGRAMMER

The present invention relates to a reference voltage generator for a programmer as applicable in particular to a temperature controller.

The basic concept of this reference voltage generator arises from researches carried out by the present Applicant in the design and development of a programming unit for a resistance furnace.

The principle of programming of a resistance furnace is as follows:

A reference voltage is put in opposition to the voltage delivered by the thermocouple which measures the temperature of the furnace and is equal at each instant to the voltage which should be delivered by the thermocouple in order to produce a variation in temperature as a function of time in accordance with the desired law ($\theta=f(t)$)); let $U=F(t)$ be this voltage.

If the voltage $U_{TC}$ which is delivered by the thermocouple of the furnace is lower than the reference voltage $U_C$, the difference $U_e=U_{TC}-U_C$ is negative and the programmer automatically produces an increase in the quantity of heat which is supplied to the furnace through the resistors.

Conversely, if $U_{TC}$ is higher than $U_C$, the difference $U_e$ is positive and the programmer produces a decrease in $U_{TC}$ and consequently a decrease in said quantity of heat.

In the final analysis, the design function of the programmer is to maintain the difference $U_e$ as near as possible to zero so that, in consequence, the temperature of the furnace can vary as a function of time in accordance with a curve which is very close to the ideal curve $\theta=f(t)$.

The first problem to be solved in this type of programming is obviously to produce a reference voltage which varies as a function of time in accordance with the law $U=F(t)$ which has been stated above.

In a large number of cases, said law of variation comprises a succession of time intervals with linear variation. The generator in accordance with the present invention relates to these cases.

The device which is most commonly employed for producing a reference voltage in compliance with a given law $U=F(t)$ is a cam mechanism; this mechanism comprises a cylinder which is driven at constant speed, there being wound on said cylinder a cam formed of flexible plastic material which is cut to shape according to the program to be carried out, that is to say in accordance with the desired law $U=F(t)$. A pointer is applied against said cam and, depending on the shape of this latter, moves along a generator line of the cylinder. This pointer controls the rotation of a potentiometer which supplies the reference voltage.

In point of fact, a cam system of the type referred-to suffers from a number of disadvantages:

1. in the case of each program, that is to say in the case of each desired law $U=F(t)$, it is necessary to cut a cam according to a well-defined profile and this is a laborious and time-consuming procedure;

2. cutting of the cam leads to errors and positioning of said cam on the cylinder is a very difficult operation.

The present invention provides a remedy for the various disadvantages of cam systems by virtue of an electronic device which makes it possible to deliver a reference voltage in compliance with a given program, it being understood that this program is not necessarily that of a temperature controller.

More specifically, the present invention is concerned with a reference voltage generator for a programmer, said reference voltage generator being essentially characterized in that it comprises a reference potentiometer, a motor for actuating said potentiometer, a device for controlling the speed of said motor having $n$ selectable speeds, a voltage-generating device which is capable of producing $n$ selectable reference voltages, a comparator having two inputs, the second input receiving in succession one of the $n$ reference voltages supplied by said voltage-generating device, a timing device controlled by said comparator and capable of producing $n$ selectable time intervals, a selector-switch device, said motor for actuating the potentiometers being of the pulse-feed, step-by-step type, and a second potentiometer which is mounted on the same shaft as the reference potentiometer but which has difference characteristics (resistance and supply voltage) in order to enhance the accuracy of the voltage thresholds, said second potentiometer being connected to the first input of the comparator in the place of the reference potentiometer. By means of this assembly, the temperature control system can be made totally independent of the programming system.

If a stepping motor is employed to actuate the two potentiometers, the device for controlling the speed of this motor can advantageously be a pulse generator of the unijunction transistor type in which the input is connected to the terminals of a capacitor, the charge circuit of said capacitor being provided with $n$ selectable resistors.

Further properties and advantages of this invention will become apparent from the description which is given below with reference to the accompanying drawings and in which one embodiment of the generator in accordance with the invention is given by way of explanation but not in any sense by way of limitation.

In these drawings:

FIG. 1 is a general schematic diagram of the reference voltage generator in accordance with the invention;

FIG. 2 represents the circuit of a pulse generator for controlling the speed of the motor which actuates the two potentiometers and FIG. 3 is a diagram of one stage of the timing device.

The reference voltage generator in accordance with the present invention will be described hereinafter in its application to the programming of a temperature controller for a resistance furnace.

The desired reference voltage is obtained across the terminals of a "10-turn" reference potentiometer $P_c$ (as shown in FIG. 1) which is supplied with a stabilized direct current voltage of 50 mV. The potentiometer has a total resistance of 2.5 ohms (this being the lowest value which is commercially available at the present time), so that the voltage delivered by its slider can be considered as being derived from a perfect voltage generator (zero internal impedance).

The voltage derived from the reference potentiometer $P_c$ and the voltage derived from the thermocouple 10 of the temperature controller 20 are put in opposition and said controller provides a very small difference between these two voltages (a difference of less than 20 $\mu$V. if the temperature regulation is good).

It is only necessary to control the slider of the reference potentiometer $P_c$ in such a manner that it passes along the curve, which gives the temperature as a function of time.

This control operation is advantageously carried out by means of a stepping which actuates the sliders of potentiometer $P_r$ and of a 10 turn potentiometer, the speed of which can be controlled by the user (indication of gradients) and the direction of rotation of which can be reversed (for the rising and falling portions of the curve).

In order to cover the range of gradients which is commonly employed, provision must be made for a system which is capable of indicating gradients comprised between 0.2° C./mm. and 20° C./mm. For the control of the reference potentiometer $P_c$, this calls for a motor which, by simple indication, can have a speed which varies in the ratio 1 to 100.

The stepping motor 2 makes it possible to cover this speed range provided that it is controlled by a pulse generator having a frequency which can vary in this ratio of 1 to 100 and a unijunction transistor oscillator is preferably employed for this purpose. FIG. 2 is a schematic presentation of the circuit of an oscillator of this type for controlling the speed of the stepping motor. This circuit comprises a pulse-switching device 3, a transistor 11, the input circuit of which is connected to the terminals of a capacitor 17 which is charged through a resistor 18 under the action of a voltage source which is not shown in the drawings, an electronic switch 4 which permits rapid switching at the level of the stepping motor 2, said motor which permits 48 positions per revolution being followed by a reduction unit 7 which provides a ratio of 1/1000.

Under these conditions, it is necessary to have 48 pulses derived from the unijunction transistor oscillator in order that the motor 2 should perform 1 revolution and therefore 48,000 pulses for 1 revolution at the output of the reduction unit, which gives a definition of indication on the reference potentiometer $P_c$ of 1/48,000 in 1 revolution and 1/480,000 for the complete indication assembly ("10-turn" potentiometer $P_c$). The electronic switch 4 comprises two inputs 5 and 6 for permitting the rotation of the motor 2 either in one direction or in the other by pulse switching and by means of two flip-flops 12 and 13.

The value of the gradient of the time-temperature curve referred to above is controlled by fixing the value of the resistor 18 and therefore the charge time constant of the capacitor 17. Different resistors which have previously been indicated are accordingly selected for this purpose.

Since a voltage of 50 mV. is developed across the terminals of the reference potentiometer $P_c$, this corresponds to 5 mV. per revolution.

If the thermocouple of the resistance furnace controller to which the reference voltage generator in accordance with the present invention is applied is a NcNa thermocouple, a voltage of 41 $\mu$V. corresponds to 1°, therefore, at 0.2° C./minute, 8.2 $\mu$V./minute. In consequence, it is necessary to have 8.2/100 =1.64/1000 revolution per minute in the case of the lowest speed, namely 1.64 r.p.m. in the case of the stepping motor, namely 1.64×48/60=1.31 pulse/second: 20° C. therefore require 131 pulses/second.

The indication can be varied at will by the operator during the course of manipulation.

A "10-turn" potentiometer permits indication with a degree of accuracy which is considerably higher than that which is usually necessary.

There is interposed between the reduction unit 7 and the potentiometer $P_c$ an electric clutch unit 8 which also enables the operator to vary the reference voltage in steps by acting manually on the potentiometer $P_c$.

Indication of the level stages of the time-temperature curve is provided by the second "ten-turn" potentiometer 1 having a resistance of 10 kilohms and supplied with current at 30 V., said second potentiometer being mounted on the same shaft as the reference potentiometer $P_c$ and the sliders of both potentiometers being placed in the same position so that these latter both deliver at each instant the same fraction of the voltage at their terminals.

The voltage supplied by the slider of said potentiometer 1 is successively put in opposition to the voltage supplied by the sliders of the potentiometers for indicating the thresholds $S_1$, $S_2$, $S_3$ which are also supplied with current at 30 V., this being carried out by means of the switching device 21. Depending on its sign, the difference voltage which is thus collected by means of the comparator 9 serves either to start up or to stop the stepping motor 2. The passage of this voltage through zero initiates the operation of the timing device 24 in which it defines the duration of a level stage; said timing device also produces action on the switching device 21 so as to switch the value of the following threshold.

It will now be assumed by way of example that a level stage of 500° C. is to be indicated:

Pointer-type revolution counters comprise a short pointer which counts the number of revolutions and a long pointer which shows the fraction of revolution to be added to the indication.

The reference potentiometer $P_c$ is supplied with current at 50 mV.

The potentiometers 1, threshold 1, threshold 2, threshold 3 are supplied at 30 V.

The following table can therefore be drawn up:

|  | Reference potentiometer | 1, S$_1$, S$_2$, S$_3$ |
|---|---|---|
| Each revolution is divided into 10 graduations, viz. | 1 rev... 5 mV. | 3 mV. |
|  | 1 grad... 0.5 mV. | 0.3 V. |
| Each graduation into 5 divisions, viz. | 1 div  100 T V. | 60 mV. |
| One half division (namely one-thousandth) can readily be appreciated, viz. | ½ div. 50 T V. | 30 mV. |

Tables show that, at 500° C., a nickel-chrome, alloyed nickel thermocouple delivers 20.65 mV.

The indication will therefore be made on $S_1$ (level stage 1):

|  | Reference equivalent, mV. | Actual voltage on S$_1$, V. |
|---|---|---|
| 4 revolutions | 20 | 12 |
| 1 graduation | 0.5 | 0.3 |
| 1.5 division | 0.15 | 0.09 |
|  | 20.65 | 12.39 |

When the reference potentiometer $P_c$ finally reaches 4 revolutions, 1 graduation, 1.5 division, it will deliver 20.65 mV. in opposition to the thermocouple, which will in fact correspond to 500° C.

The potentiometer 1 which is driven at the same time will also reach 4 revolutions, 1 graduation, 1.5 division, but will in this case indicate 12.39 V.

The sensitivity of comparator 9 is about 20 millivolts since it receives the difference in the voltages indicated by $S_1$ (12.39 V.) and by the potentiometer 1 (which increases) and, as soon as this difference falls below 20 mV., the detector will cause the motor to stop with an error which is smaller than one thousandth since it has been seen that in the case of $S_1$ one thousandth corresponds to 30 mV.

The reference voltage which is put in opposition to the thermocouple will therefore in fact attain the desired value to within 1/1000. The stoppage of the motor and therefore the establishment of a level stage will last the time indicated in the time setting of the first threshold.

Indication of the duration of the level stages (plateaus) of the curve is carried out by means of the timing device (unit 24) comprising, for example, a unijunction transistor oscillator 14 which controls a thyratron 15 which in turn controls a relay 16, as seen in FIG. 3.

The unijunction transistor has a high input impedance which provides time constants of substantial value.

The value of resistor 22 is such that the charge on the capacitor 23, which is associated therewith, has a time constant which corresponds to the desired time duration. This timing device controls the changes of speeds of the stepping motor 2. Each stage comprises, for example, a unijunction transistor oscillator 14 and this latter controls a thyratron 15 which in turn controls a relay 16 (as shown in FIG. 3).

The unijunction transistor has a high input impedance which permits time constants of substantial value.

The value of the resistor 22 such that the charge on the capacitor 23 which is associated therewith is effected with a time constant which corresponds to the desired duration.

I claim:

1. A reference voltage generator for a programmer as applicable in particular to a temperature controller comprising a reference potentiometer connected to the temperature controller to provide a control signal thereto, a motor for actuating said potentiometer, a device for controlling the speed of said motor having $n$ selectable speeds, a voltage-generating device which is capable of producing $n$ selectable reference voltages, a comparator having two inputs, the second input receiving in succession one of the $n$ reference voltages supplied by said voltage-generating device, a timing device controlled by said comparator and capable of producing $n$ selectable time intervals, a selector-switch device controlled by said timing device and controlling the reference voltages supplied to said comparator and a second potentiometer, a shaft for said motor driving said potentiometers, said second potentiometer having different characteristics of resistance and supply voltage whereby the accuracy of the voltage thresholds is improved, said second potentiometer being connected to the first input of said comparator.

2. A generator in accordance with claim 1, said motor actuating said potentiometer being a pulse-fed stepping motor.

3. A generator in accordance with claim 2, said device for controlling the speed of the stepping motor being a unijunction transistor pulse generator, a capacitor, an input for said generator connected to the terminals of said capacitor, a charging circuit for said capacitor and $n$ switchable resistors in said charging circuit.

4. A generator as described in claim 1, said timing device including a unijunction transistor oscillator, a thyratron controlled by said oscillator and a relay controlled by said thyratron, said relay successively connecting said switch device to said voltage generating device to supply said reference voltages.